(No Model.)
H. R. CASSEL.
APPARATUS FOR SEPARATING METALS FROM ORES OR ALLOYS.
No. 360,852. Patented Apr. 12, 1887.
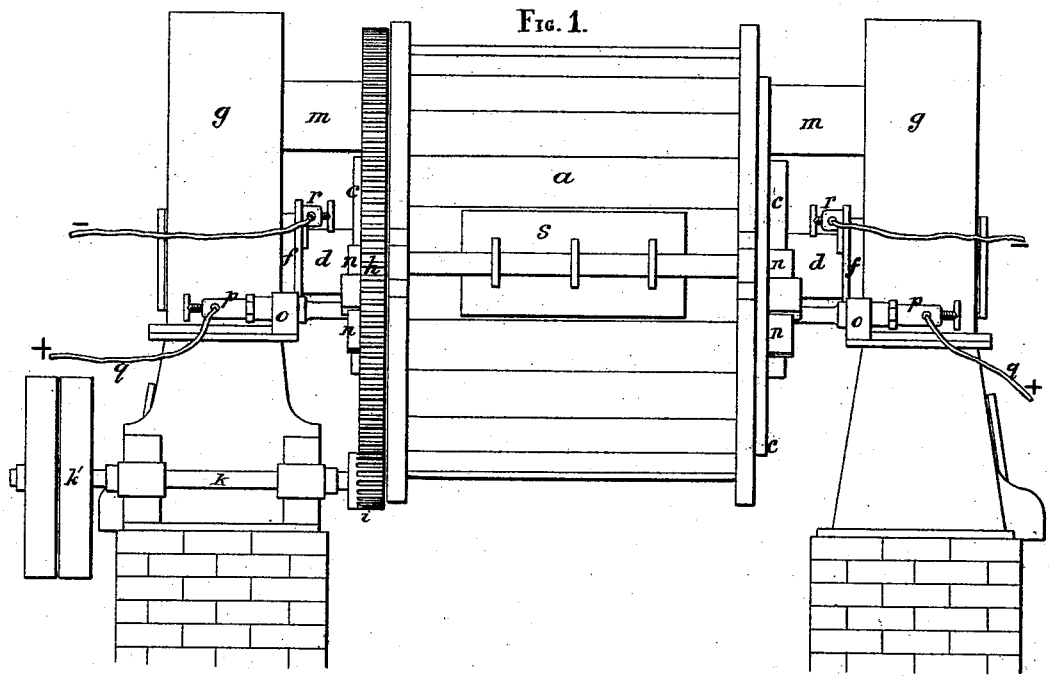
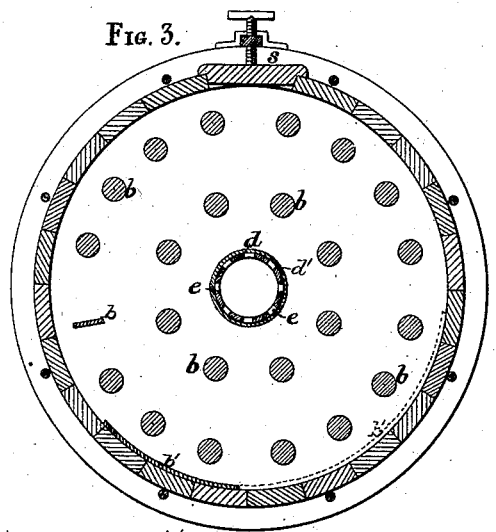
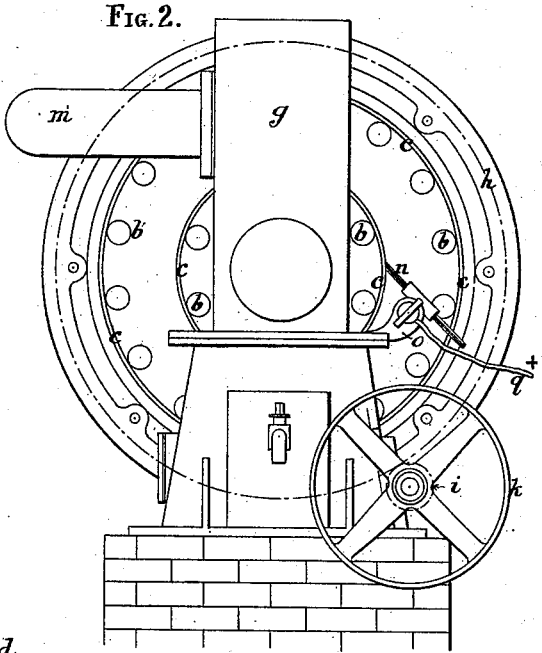
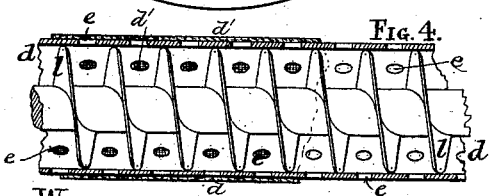
WITNESSES:
Geo. W. Sues.
N. L. Collamer.
INVENTOR:
Henry Renner Cassel
By F. C. Somers
ATTORNEY.

UNITED STATES PATENT OFFICE.

HENRY RENNER CASSEL, OF NEW YORK, N. Y., ASSIGNOR TO THE CASSEL GOLD EXTRACTING COMPANY, (LIMITED,) OF GLASGOW, SCOTLAND.

APPARATUS FOR SEPARATING METALS FROM ORES OR ALLOYS.

SPECIFICATION forming part of Letters Patent No. 360,852, dated April 12, 1887.

Application filed March 8, 1886. Serial No. 194,471. (No model.) Patented in England July 15, 1885, No. 8,574.

*To all whom it may concern:*

Be it known that I, HENRY RENNER CASSEL, a citizen of the United States of America, residing at New York, in the county and State of New York, metallurgist, have invented a new and useful Improvement in Apparatus for Separating Metals from Ores or Alloys, (for which I have obtained a patent in Great Britain, No. 8,574, dated July 15, 1885,) and of which the following is a specification.

This invention relates to an apparatus for separating metals from ores or alloys, and especially auriferous compounds, by electrolysis, in which the metals are dissolved at the positive pole, separated from the ore or alloy within the electrolytic bath, and deposited at the negative pole at one and the same operation. The most powerful solvent which can be produced on a large and commercial scale for gold and most other metals is chlorine, and this can be easily generated by electrolyzing a solution of common salt. The chlorine and oxygen are set free at the anode, and if this pole be of metal it will be readily dissolved, and the dissolved metal will be carried over to be deposited at the cathode; but if the anode be composed of carbon, any particle of metal coming in contact therewith during electrolysis will also be readily dissolved.

Gold ores containing antimony, sulphur, arsenic, tellurium, bismuth, and many other compounds, called "refractory" or "rebellious," are also commonly designated as "pyrites." Their treatment offers great difficulty, and it is usual to roast or calcine them in order to oxidize the sulphur, arsenic, antimony, &c., and so set the gold free. In the electrolytic process the roasting or calcining of the ores is unnecessary, as the nascent chlorine and oxygen are the means of oxidizing the pyrites and setting the gold free, which is then converted into auric chloride, and when lime is added, as explained in my previous patent of the United States numbered 300,951, dated June 24, 1884, the gold is deposited at the cathode in the form of a black slime.

The object of this invention is to provide an electrolytic apparatus of the character described, in which the operation can be performed economically on a large scale.

In the accompanying drawings, Figure 1 is a side elevation of this improved apparatus. Fig. 2 is an end elevation thereof. Fig. 3 is a transverse section of a rotary drum constituting a part thereof. Fig. 4 is a longitudinal section of a hollow perforated shaft, on which said drum is mounted, provided with a screw-conveyer.

Similar letters of reference indicate corresponding parts in the different figures.

A rotary drum, $a$, preferably constructed of wood, constitutes a part of this apparatus. If constructed of metal, the drum must be thoroughly insulated inside. This drum is provided on its interior with carbon anodes $b$, which are preferably in the form of rods extending longitudinally of the drum from end to end thereof. If desired, the anodes may be in the form of plates, and the entire interior face of the drum may be lined with carbon or plumbago, as shown at $b'$. I use carbon for the anodes, for the simple reason that metals would immediately be attacked and dissolved by the chlorine developed during the operation. The ends of the rods $b$ extend through the ends of the drum to effect connection with the positive pole of the source of electricity. Rubber cement, marine glue, or other suitable compound is employed to effect a tight joint between the rods and the heads of the drum. The projecting ends of the carbon rods are preferably provided with a metallic coating or metallic caps, and are connected with each other by a metallic band or rod, $c$, which is soldered or otherwise secured to said ends.

The drum may be provided with one or more rows of carbon rods, and when two or more rows are employed they must be suitably connected. The drum may be of any desired dimensions, and is mounted upon a hollow metallic shaft, $d$, of copper, iron, or other suitable metal, and is fixed thereto or adapted to rotate thereon in any suitable manner, rubber or other washers being used to prevent leakage. This shaft is provided with a number of perforations, $e$, of any desirable size, due regard being had to the strength of the shaft. The exterior of this perforated hollow shaft is insulated, and provided with a covering, $d'$, of asbestus cloth, which incloses the shaft and covers the holes. The asbestus cloth is preferably made to adhere to the shaft by means of rubber cement, marine glue, or otherwise. This asbestos cloth serves as a filter, which prevents the passage of the crushed ore, but permits the passage of the electric current and of the metals in solution. Instead of asbestos cloth slag-wool may be employed as the material of the filter, or slag-wool in connection with asbestos. The ends of the asbestos-cloth filter are fastened under flanges against the sides of the drum; or they may be fastened on the shaft by means of suitable rings of hard rubber, or otherwise. The interior of the drum outside the shaft $d$ constitutes the anode-compartment of the apparatus, and the said perforated shaft constitutes in part the cathode-compartment thereof, the asbestos filter $d$ separating the anode from the cathode compartment. The ends of the hollow shaft $d$ pass through stuffing-boxes $f$, and are supported in bearings in the hollow metal standards $g$, which serve as tanks, and also constitute in part the cathode-compartment. The drum is provided with a fixed cog-wheel, $h$, which meshes with the pinion $i$ on the driving-shaft $k$, said shaft being actuated by the driving-pulley $k'$. The perforated hollow cathode-shaft $d$ is provided on its interior with a screw-conveyer, $l$, for the purpose of causing the solution to circulate when the drum is revolving, and also for conveying into either or both tanks $g$ any slime that has gathered in the shaft. This conveyer may be of the same length as the shaft, or any fraction of that length. The tanks $g$ are connected with each other by a suitable pipe, $m$, to enable the solution to circulate freely.

The electric current is conveyed to the anodes by means of brushes or rollers $n$, which are fastened in brackets $o$, attached to the standards $g$, and bear upon the metallic rod or band $c$, connecting the anodes. These brushes are properly insulated, and are connected at $p$ with one pole of the source of electricity by wire $q$. The other pole of the apparatus is connected with the shaft $d$ or standards $g$ at $r$, so that both shaft and standards form the negative pole in the apparatus.

The operation is as follows: The apparatus being filled to a point at or above the center of the shaft $d$ with the electrolyte composed of common salt-water, the drum is charged with the pulverized ores through the openings $s$, which are provided with means for tight shutting, a rubber ring being inserted to prevent leakage. The drum is then set in motion and the current switched on, the latter being conveyed by wire $q$ to the brushes $n$, band $c$, and carbon anodes $b$, then through the electrolyte to the shaft $d$, thence to the standard tanks $g$, and back to the battery or source of electricity. The metals in the pulverized ores are constantly thrown against the anodes when the drum is revolving, and thus forming frequently a part of the anode itself, and are thereby brought into most intimate contact with the nascent chlorine and oxygen generated at the positive pole, whereby they are readily dissolved. The metal in solution passes through the asbestos-cloth filter surrounding the perforated hollow shaft $d$, and is deposited electrolytically within said shaft in the form of a black slime. It is thence conveyed by the screw-conveyer $l$ into standard tanks $g$, whence it can be easily collected for smelting.

Several of these apparatus may be placed in circuit.

I claim as my invention—

1. In an apparatus for separating metals from ores or alloys by electrolysis, the combination of a journaled drum provided with carbon anodes, a hollow perforated metallic shaft arranged axially of said drum and constituting a cathode-compartment, a filter separating said shaft from the interior of said drum, and upright hollow standards with which said shaft is connected, said standards constituting cathode-compartments, substantially as described.

2. In an apparatus for separating metals from ores or alloys by electrolysis, the combination of a journaled drum provided with carbon anodes, and a hollow metallic shaft insulated on its exterior and extending through said drum, said shaft being perforated within the drum and separated from the interior thereof by a filter, substantially as described.

3. In an apparatus for separating metals from ores or alloys by electrolysis, the combination of a journaled drum provided with carbon anodes, a hollow metallic shaft insulated on its exterior and extending through said drum, said shaft being perforated within the drum and separated from the interior thereof by a filter, and a screw-conveyer within said hollow shaft, substantially as described.

4. In an apparatus for separating metals from ores or alloys by electrolysis, the combination of a journaled drum provided with carbon anodes, a hollow perforated metallic shaft for supporting said drum and constituting a cathode-compartment, upright hollow standards with which said shaft is connected near opposite ends of the drum, said hollow standards constituting cathode-compartments, and a pipe connecting said standards above the axis of the drum, substantially as described.

5. In an apparatus for separating metals from ores or alloys by electrolysis, the combination of the journaled drum $a$, provided with carbon anodes in its interior and with the gear $h$ on its exterior, the upright tanks $g$, provided with stuffing-boxes, a hollow perforated metallic shaft passing through said stuffing-boxes and having its bearings in said tanks, said drum being supported on said shaft, the driving-pinion $i$, for rotating said drum, and suitable electric connections, substantially as described.

HENRY RENNER CASSEL.

Witnesses:
CHAS. A. ALLISON,
HERBERT J. ALLISON.